United States Patent [19]
Calinaud et al.

[11] Patent Number: 6,010,191
[45] Date of Patent: Jan. 4, 2000

[54] VEHICLE BACKREST TILT ADJUSTMENT MECHANISM

[75] Inventors: Jean-Claude Calinaud, Morigny; Jean-Yves Loreau, Thiais; Ludovic Chaillou, Massy, all of France

[73] Assignee: Bertrand Faure Equipements S.A., Boulogne, France

[21] Appl. No.: 09/049,380

[22] Filed: Mar. 27, 1998

[30] Foreign Application Priority Data

Mar. 27, 1997 [FR] France ..................................... 97 03974

[51] Int. Cl.⁷ ....................................................... B60N 2/22
[52] U.S. Cl. ........................................... 297/367; 297/365
[58] Field of Search ............................. 297/367, 348.12, 297/369, 364, 365

[56] References Cited

U.S. PATENT DOCUMENTS

| | | | |
|---|---|---|---|
| 4,082,352 | 4/1978 | Bales et al. .............................. | 297/364 |
| 4,103,970 | 8/1978 | Homier ................................ | 297/367 X |
| 5,216,936 | 6/1993 | Baloche ................................ | 297/367 X |
| 5,573,345 | 11/1996 | Voss et al. . | |
| 5,590,931 | 1/1997 | Fourrey et al. ........................ | 297/367 X |
| 5,681,086 | 10/1997 | Baloche et al. ........................... | 297/367 |
| 5,769,494 | 6/1998 | Barrere et al. ................... | 297/378.12 X |
| 5,788,325 | 8/1998 | Ganot ................................... | 297/367 X |

FOREIGN PATENT DOCUMENTS 2729108  7/1996  France .

Primary Examiner—Peter M. Cuomo
Assistant Examiner—Stephen Vu
Attorney, Agent, or Firm—Pollock, Vande Sande & Amernick

[57] ABSTRACT

The seat for automobile vehicles includes a seat frame and a backrest frame installed so as to pivot on the seat frame. A mechanism locking the backrest in position. The mechanism includes two half-housings which can rotate in relation to each other around a pivoting axis and attached to a flange of the seat frame and to a flange of the backrest frame respectively. At least one of the two half-housings includes studs inserted into holes formed in the corresponding seat frame flange and a space is then made between at least one stud and the corresponding hole into which a weld mass is deposited. The weld mass joins the seat frame half-housing to the seat frame flange.

8 Claims, 3 Drawing Sheets

VEHICLE BACKREST TILT ADJUSTMENT MECHANISM

FIELD OF THE INVENTION

This invention concerns a seat for automobile vehicles and, more especially, the connection between a seat and a backrest using mechanisms ensuring backrest tilt adjustment.

BACKGROUND OF THE INVENTION

Conventionally, these mechanisms are installed on each side of the seat, between a seat flange, consisting of the rear part of the seat frame, and a backrest flange, consisting of a lower part of the backrest frame.

These mechanisms, ensuring the rotational locking of the backrest may therefore have to support a very high pivoting torque.

When a collision occurs generating a very high load on the backrest of the seat, the pivoting torque may reach values of around 200 to 250 mN on the mechanism. For seats with seat belts attached to the seat, that is to say where the mechanical attachment of the belt is made at the upper part of the seat backrest, the inertia of the user's body causes, during a front-end collision, an additional load and the total load on the backrest may then be doubled.

This mechanism must therefore be capable of supporting high stresses and, in particular, the means attaching the hinge to each flange must be specially reinforced.

Mechanisms which ensure the positional locking of the backrest are already known, especially by document FR-A-2 729 108. A mechanism of this type, which in the remainder of the text will be called "hinge" for simplification reasons is shown on FIGS. 2 to 5 and is in the form of a fairly flat cylindrical housing 4 consisting of a swaged peripheral ring 30 enclosing two half-housings 10, 20 which can rotate in relation to each other and are attached to the seat flange 5 and to the backrest flange 6 respectively. The half-housing 20, constituting a bottom of the housing, includes, on its periphery, on the face located towards the inside of the housing, a concentric ring equipped with inner teeth 21. The half-housing 10, constituting a cover of the housing, includes, on its inner face, located towards the inside of the housing, stampings 12 which between them define grooves, ensuring the radial guidance of locking toothed plates 40. These toothed plates, generally 3 in number and spaced 120° apart, include, at an end oriented radially towards the outside, a tooth 41 shaped to mate with the tooth 21 of the ring. An eccentric 31, located in the center of the housing and onto which the springs 32 apply a rotational torque, push the toothed plates towards the ring to ensure locking. A control handle (not shown) enables the eccentric to be pivoted via toothed shaft 33 in the opposite direction to free the toothed plates and allow the backrest to pivot.

The positioning and the attachment of the bottom 20 and the cover 10 of the hinge on the flanges of the backrest and seat respectively are ensured by several cylindrical stamped studs 15 and 16, conventionally six in number, made on each half-housing. The said studs are designed to be inserted into holes formed in each flange. Once the cover 10 and the bottom 20 are in position on the respective flanges, a weld bead 14 is formed on the studs also overlapping onto the flange. This joining operation provides the mechanical strength required by the hinge to support the very high pivoting torque.

This welding operation may locally distort the bottom 20 and the cover 10 of the housing and, more especially, the guide grooves, when the weld is made on a stud located at the level of such a groove. This local distortion of the guide grooves may then cause the sticking of the toothed plate preventing correct locking or, at least, cause the locking mechanism to malfunction during a collision.

BRIEF DESCRIPTION OF THE INVENTION

The aim of this invention is to solve these problems and especially to provide better safety by preventing the risk of the toothed plates sticking and the incorrect locking which would result. It also aims in reducing the number of welds required, without, for this, reducing the mechanical strength required.

With these targets in mind, the subject of the invention is a seat for automobile vehicles including a seat frame, a backrest frame, mounted so as to pivot on the seat frame, and a mechanism for locking the backrest in position, this mechanism including two half-housings which can rotate in relation to each other around a pivoting axis and attached to a flange of the seat frame and to a flange of the backrest frame respectively, at least one of the half-housings including studs inserted into holes formed in the corresponding flange and welded to the said flange, characterized in that a space is made between at least one stud and the hole into which it penetrates and in that a weld bead connecting the half-housing to the flange is made in the said space.

The invention enables, thanks to the strengthening obtained by the welds thus made, a reduction in the number of welded studs and therefore, more especially, eliminates the need to make welds on additional studs located at the level of the toothed plate guide grooves or even eliminates the need for such additional studs.

This invention also enables, in comparison with the earlier technique, the elimination of the local distortion of the guide grooves, caused during the stud welding operation, by eliminating the welding of the studs located at the level of the guide grooves. In order to conserve the same mechanical strength, the said space is made in the vicinity of the studs which are not located at the level of the guide grooves so that the weld bead penetrates into this space, thus compensating for the elimination of the weld beads at the level of other studs.

According to a special arrangement of the invention, the studs inserted into the holes are cylindrical and the holes with a space, corresponding to the studs to be welded, have, in at least one radial direction, a dimension greater than the diameter of the studs.

Preferably, the width of the holes is more or less equal to the diameter of the studs. Thus the studs penetrate into the holes without significant clearance in the direction crosswise to the direction in which the holes are enlarged. If the holes are not enlarged in the circumferential direction of the circle passing through the axes of the studs, the angular positioning of the hinge in relation to the flange thus remains accurately ensured during installation, even if there are no additional unwelded studs or other means intended to ensure this positioning.

Other characteristics and advantages of the invention will appear in the description which will be given of a seat for vehicles in compliance with the invention.

BRIEF DESCRIPTION OF THE FIGURES

Also refer to the appended drawings on which.

DETAILED DESCRIPTION OF THE INVENTION

Figure 1:
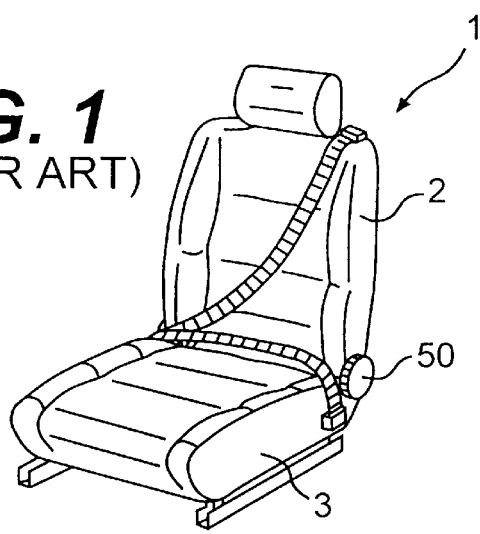
FIG. 1 is a general perspective view of a prior art vehicle seat including a hinge for adjusting and securing the position of the backrest in relation to the seat.
Figure 3:
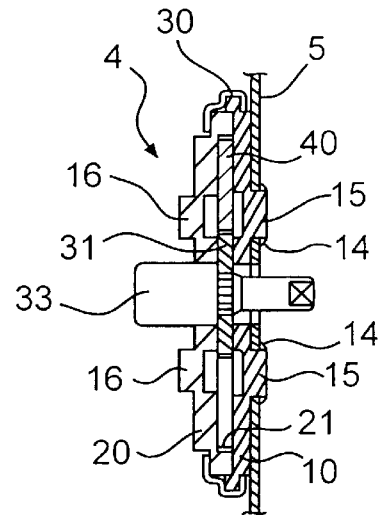
FIG. 3 is a sectional view through line 3—3 of FIG. 2.
Figure 2:
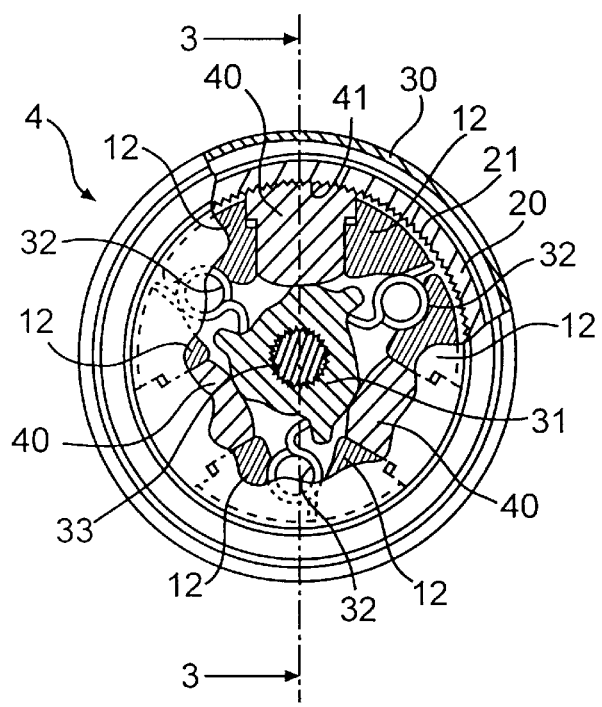
FIG. 2 is a front view, with cutaway, of a hinge mechanism according to the prior art.

The seat 1 for automobile vehicles, as shown on prior art FIG. 1, consists of a backrest 2, a seat 3 and a hinge 4, the unlocking control means 50 of which can be seen on FIG. 1.

This seat is equipped with a so-called "onboard" seat belt, that is to say where the mechanical attachment of the said belt with the upper part of the backrest 2 is made directly on the upper edge of the backrest 2. The use of such an arrangement generates, during an accident, a high pivoting torque at the level of the hinge; the application of the invention is however not limited to this type of seat.

FIGS. 2 to 5 are prior art diagrams and will not be looked at again here. These figures show a hinge of the conventional type, also used in the design example of this invention, the general description of which was given in the presentation of the known technique.

It is simply recalled that this hinge includes cylindrical studs 16 and 15 located on the bottom 20 and the cover 10 of the hinge housing 4 respectively. These studs, protruding towards the outside of the housing are inserted, on installation, into holes formed made in the flanges of the seat 5 and of the backrest 6. As explained previously, according to the earlier technique, the six studs conventionally used on each side of the hinge are welded to the flanges 5 and 6 by weld beads 14 made at the interface between the studs and the circular holes into which they are inserted. As already stated, the studs 15a, which are located at the guide grooves of the toothed plates 40, can cause, during this welding operation, the distortion of the said grooves.

In order to get around this disadvantage, the holes 51 which will accommodate the studs 15b to be welded, are enlarged to make a space E between each stud to be welded and the edge of the corresponding hole.

Figure 6:
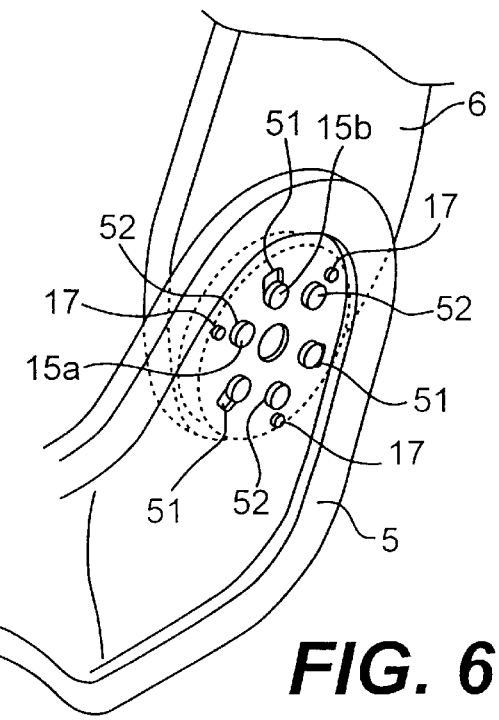
FIG. 6 is a detailed perspective view of a seat in compliance with the invention showing the flanges of the backrest and seat respectively and the attachment of the hinge to the seat flange in compliance with this invention.

FIG. 6 shows a preferential design of the invention where only the installation area, where the hinge 4 is located, is shown. A seat flange 5, constituting the rear part of the frame of the seat 3 and located laterally towards the outside of the seat, a backrest flange 6, constituting the lower part of the frame of the backrest 2 and the hinge 4, which is inserted between the said flanges 5 and 6, is shown on this figure. The said hinge includes six cylindrical studs 15a, 15b spaced circumferentially on the cover 10, and six studs 16 spaced in the same way on the bottom 20. The cover 10 and the bottom 20 are attached to the seat flange 5 and the backrest flange 6 respectively.

The attachment of the cover 10 to the seat flange 5 will now be described in more detail considering that the attachment of the bottom 20 to the backrest flange 6 can be achieved in a similar manner. As the guide groove distortion problems mentioned above do not however concern the attachment of the bottom 20 to the backrest frame 6, this attachment could also be made according to the earlier state of the art.

Figure 7:
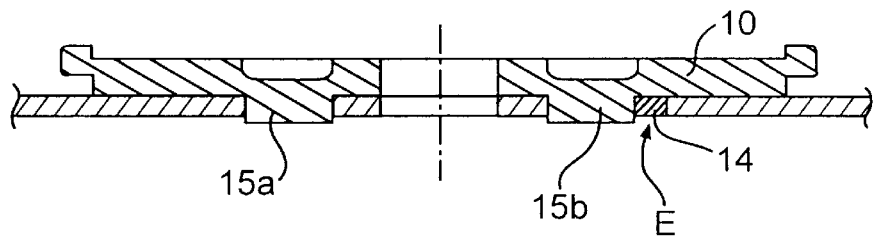
FIG. 7 is a diametrical sectional view of the cover alone, attached to the seat frame and showing the filling by the weld bead of the space made between the stud and the hole in the flange.

The seat flange 5 includes three holes 51 made in compliance with this invention and inside which are inserted three studs 15b which are not located at the level of the toothed plate guide grooves. The width of these holes 51 is more or less equal to the diameter of the corresponding stud and extend radially over a length greater than the diameter of the said stud. These holes have a semi-circular shape inside which the corresponding studs are inserted, and a rectangular shape extending radially towards the outside, so that a space E exists between the edges of the hole and the corresponding stud. Then, as shown on FIG. 7, weld 14 is made inside the spaces E made for each stud 15b, thus enabling the definitive attachment of the cover 10 to the seat flange 5. The weld thus made joins the studs 15b to the metal sheet comprising the flange and, by penetrating into space E, also directly attaches the flange to the portion of the cover adjacent to the studs, accessible through this opening, as can be clearly seen on FIG. 7. The surface area thus directly reached by the weld is considerably increased in relation to the earlier technique and this especially provides increased mechanical strength for the welded junction at each stud.

Cover 10 also includes studs 15a, located at the level of the toothed plate guide grooves and which are inserted without clearance into the cylindrical holes 52; these holes having a diameter more or less equal to the diameter of the corresponding stud. All studs 15a and 15b are subjected to shear stress when a pivoting torque is applied to the junction between the cover 10 and the flange 5. The studs 15a are not welded, as is shown on FIG. 7, and enable the shear strength of the junction between the flange 5 and the cover 10 to be increased.

However, due to the increase in strength already obtained by the welds made on the other studs, such additional studs may also not be used in which case cover 10 would then only include three studs 15b placed outside of the guide groove areas.

Figure 4:
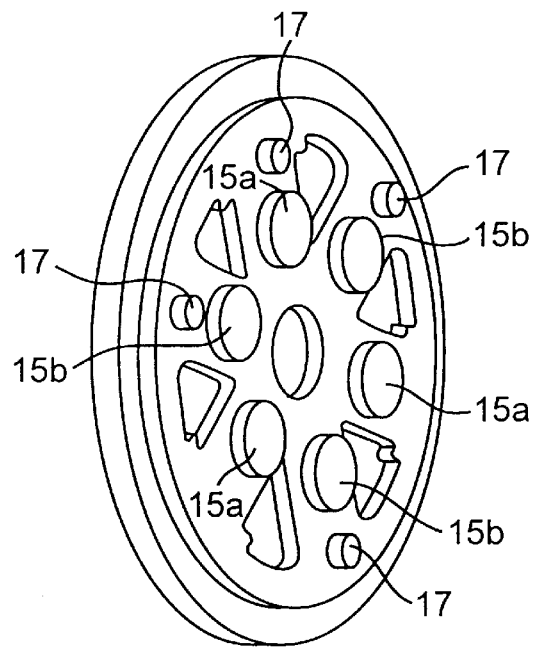
FIG. 4 is a perspective view of the outer face of the cover of the housing showing the attachment studs and locating pins of the prior art seat.
Figure 5:
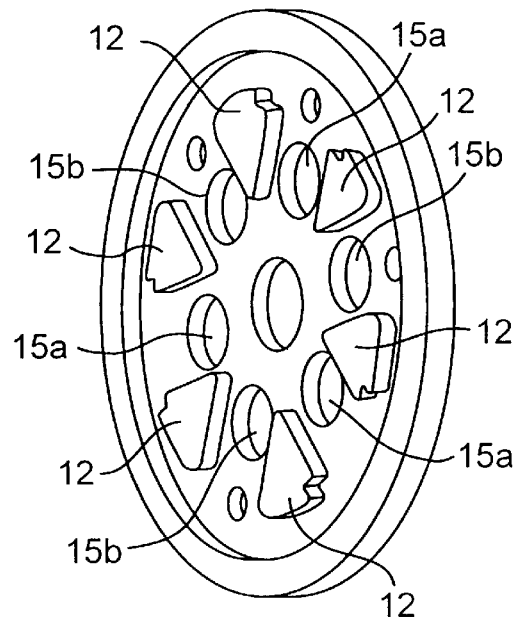
FIG. 5 is a perspective view of the inner face of the cover showing the stampings forming the toothed plate guide grooves of the prior art seat.

As shown on FIG. 4, the six studs 15a and 15b are the same and location system is required for the installation of the hinge in order to insert the studs 15b in the corresponding holes 51. Pins 17 act as a "foolproofing device" and ensure the correct positioning of the studs 15a and 15b of the cover 10 in the corresponding holes 51 and 52 made in the seat flange 5 thus eliminating the risk of welding the wrong studs during installation.

Figure 8A:
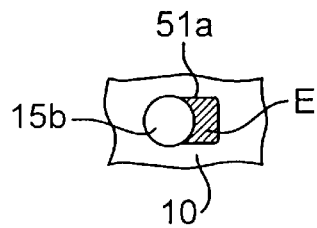
FIG. 8a to 8g show different design variants of this space.
Figure 8B:
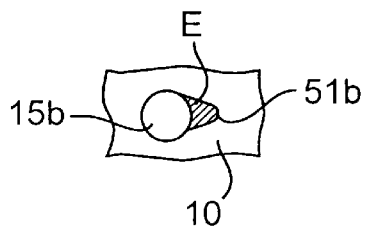
Figure 8C:
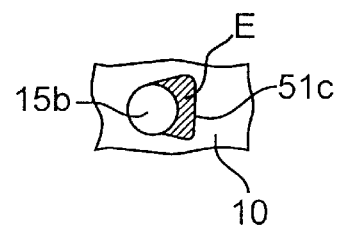
Figure 8D:
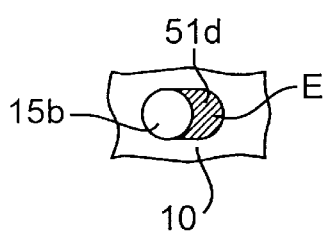

FIGS. 8a to 8g show different design variants for the holes 51 cut in the flange 5. FIG. 8a corresponds to the design example described above and FIG. 8d shows a hole 51d with an oblong shape, and a width more or less the same as that of the corresponding stud and rounded off by a half-circle at each end. FIGS. 8b and 8c show two other design variants.

Generally speaking, the shapes and sizes of the holes 51 will be determined according to the strength required for the junction between the hinge and the flange and any constraints of a geometrical character liable to influence the choice of a specific shape for the holes 51.

Figure 8E:
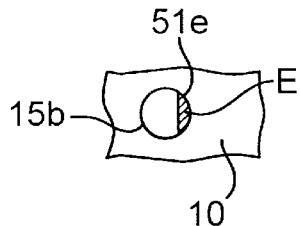

FIG. 8e shows a specific case where the space E is obtained by conserving a circular hole 51e and by making a flat on the stud 15b.

Figure 8F:
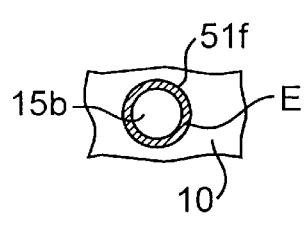
Figure 8G:
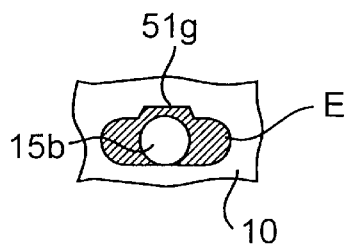

In a specific case, shown on FIG. 8f, the hole 51f is circular and has a diameter greater than that of the corresponding stud 15b. This shape of hole enables the distortions of thermal origin, induced during welding, to be uniformly distributed around the stud. In such a case, the use of additional studs, or at least pins, will be required to ensure correct positioning, before welding, of the hinge 4 on the flange 5.

When installing the cover 10 on the flange 5, it is sometimes useful to be able to ensure the angular positioning of the hinge. For this, as shown on FIG. 8g, holes 51g have an oblong shape elongated circumferentially. The holes 51g, inside which the studs 15b to be welded are inserted, include a rectangular shape extending radially towards the outside. By this arrangement, it is then possible to adjust the angular position of the cover 10 when installing the hinge on the flange 5 before final attachment.

The invention is not limited to the designs described above only as an example.

In particular:

all combinations of the various above mentioned hole shapes can be used, for different locking systems, the number of studs to be welded 15b could be different from three.

We claim:

1. A lockable adjusting device for allowing a backrest frame of a vehicle seat to selectively pivot relative to a seat frame, the device comprising:

two housing sections mounted in coaxial and rotational relation to one another about an axis;

a plurality of studs extending outwardly in parallel relation to the axis, from at least one of the housing sections, for insertion into respective holes in a flange of at least one of the frames;

the other housing section for attachement to a flange of the remaining frame;

the holes receiving the studs being larger than the studs;

a weld mass, existing in a space, between a wall of each of holes and a surface of an encircled corresponding stud for welding the stud to a respective flange;

means located between the housing sections for normally maintaining the sections in rotationally locked relation;

means for selectively releasing the locking means and allowing pivotal adjustment; and wherein the stud is cylindrical and the hole receiving the stud has a dimension, in at least one direction, that is greater than a diameter of the stud;

and further wherein the means for locking the housing sections includes housing:

(a) at least one guide groove formed in the at least one housing section;

(b) a corresponding plate slidable in the guide groove; and further wherein each of said studs is positioned in offset relation to each of said guide grooves.

2. The device set forth in claim 1 wherein a width of the hole is substantially the same as a diameter of the stud and further wherein the hole has a length that is greater that the diameter of the stud.

3. The device set forth in claim 1 wherein the hole is oblong.

4. The device set forth in claim 1 wherein the hole is configured at one end to encircle the stud and is in the shape of a semi-circle; and further wherein an opposite end of the hole is in the shape of a rectangle.

5. The device set forth in claim 1 wherein the hole is circular and has a diameter greater than that of the stud for creating the weld mass space, and further wherein at least one additional adjacent stud exists that is received within a hole that is not sufficiently large to create a space for a weld mass therein.

6. The device set forth in claim 1 wherein the hole is circular having a diameter substantially the same as the stud, and further wherein the stud has a flat surface formed along a longitudinal surface of the stud that is encircled within the space.

7. The device set forth in claim 1 wherein:

the means for locking the housing sections includes:

(a) at least one guide groove formed in the at least one section;

(b) a corresponding plate slidable in the guide groove; and further wherein each welded stud is positioned in offset relation to each guide groove.

8. A lockable adjusting device for allowing a backrest frame of a vehicle seat to selectively pivot relative to a seat frame, the device comprising:

two housing sections mounted in coaxial and rotational relation to one another about an axis;

a plurality of studs extending outwardly in parallel relation to the axis, from at least one of the housing sections, for insertion into respective holes in a flange of at least one of the frames;

the other housing section for attachement to a flange of the remaining frame;

the holes receiving the studs being larger than the studs;

a weld mass, existing in a space, between a wall of each of holes and a surface of an encircled corresponding stud for welding the stud to a respective flange;

means located between the housing sections for normally maintaining the sections in rotationally locked relation;

means for selectively releasing the locking means and allowing pivotal adjustment; and wherein the stud is cylindrical and the hole receiving the stud has a dimension, in at least one direction, that is greater than a diameter of the stud;

and further wherein the means for locking the housing sections includes:

(a) at least one guide groove formed in the at least one housing section;

(b) a corresponding plate slidable in the guide groove; and further wherein each of said studs is positioned in offset relation to each of said guide grooves;

and still further wherein projections extend from the at least one housing section and are received within mating holes formed in the flange of the at least one frame for ensuring correct positioning of the studs in said respective holes.

* * * * *